March 29, 1966 K. G. KING ETAL 3,243,711
CONTROL CIRCUIT FOR REGULATORS
Filed Nov. 6, 1961 4 Sheets-Sheet 1

March 29, 1966   K. G. KING ETAL   3,243,711
CONTROL CIRCUIT FOR REGULATORS
Filed Nov. 6, 1961   4 Sheets-Sheet 2
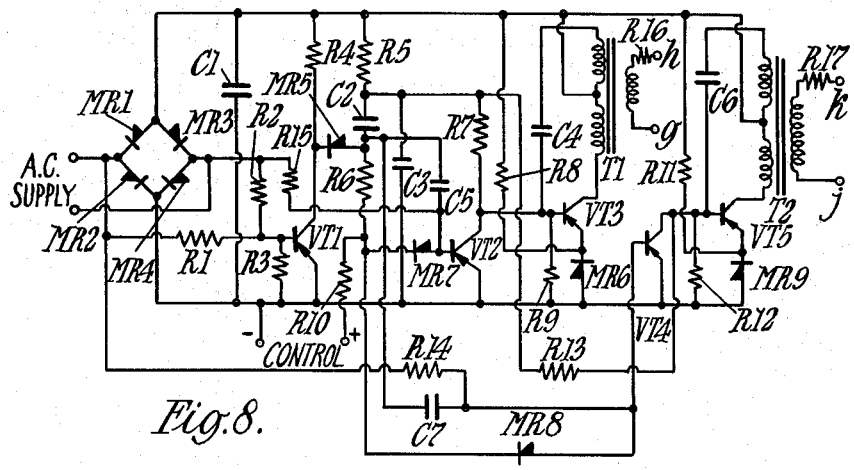
Fig.8.
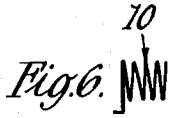
Fig.6.
Fig.7.
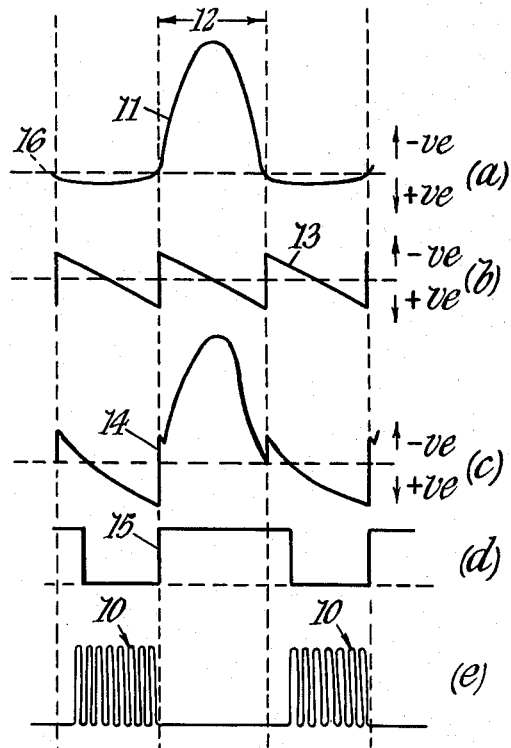
Fig.9.

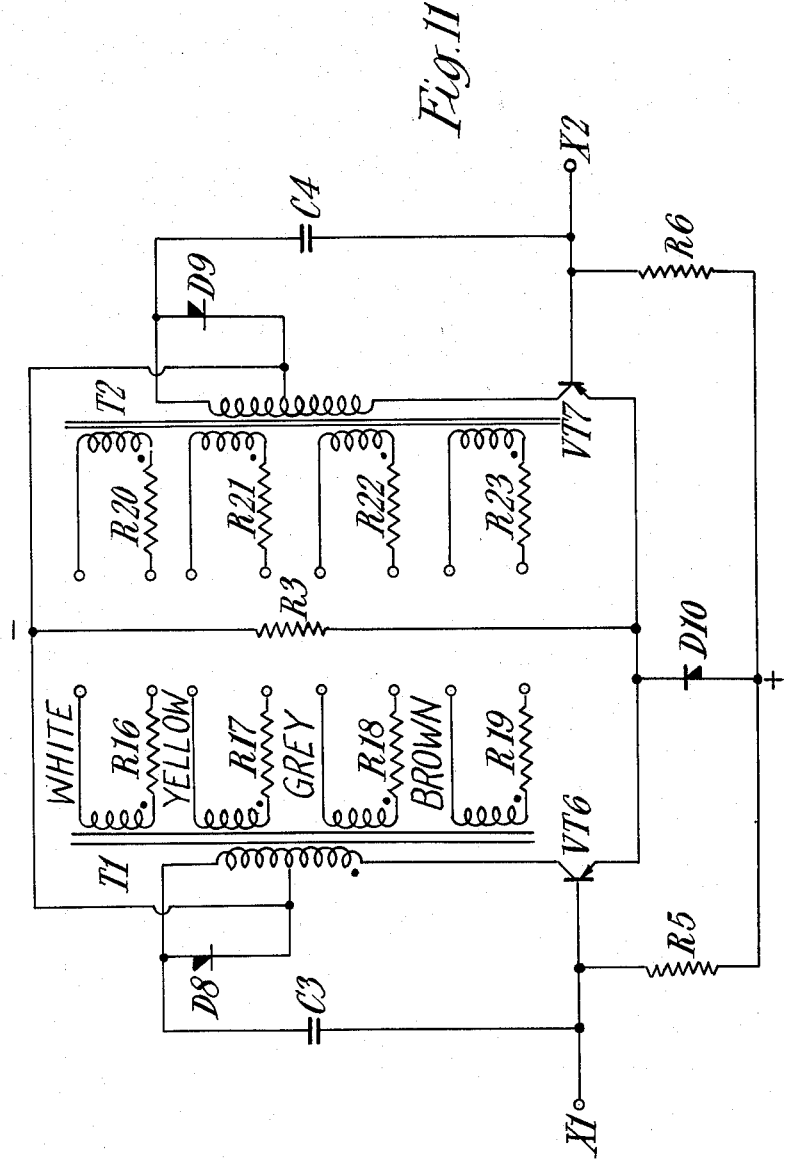

3,243,711
CONTROL CIRCUIT FOR REGULATORS
Kenneth G. King, Kenneth M. Watkins, and Richard M. T. Barry, all of London, England, assignors to Westinghouse Brake and Signal Company Limited, London, England
Filed Nov. 6, 1961, Ser. No. 150,390
Claims priority, application Great Britain, Nov. 8, 1960, 38,280/60
2 Claims. (Cl. 323—22)

This invention relates to regulators which operate from alternating current power supplies and which incorporate controllable semi-conductor rectifiers, such as, for example, Trinistors (registered trademark), and more particularly to control circuits from such regulators for supplying firing pulses of variable phase to the gates or firing electrodes of the rectifiers in order that the flow of current from the regulator to a load may be varied.

Conventional control circuits for this purpose are usually arranged to supply a single short pulse each half-cycle or cycle to the regulator, although extended steady pulses which persist, for example, until the end of the half-cycle are used under certain conditions, for example, when the regulator is being used to supply an iductive load.

It is an object of the present invention to provide an improved control circuit by means of which the effect of an extended pulse may be obtained simply and efficiently.

The present invention consists in a control circuit for an alternating current regulator which incorporates controllable semi-conductor rectifiers, wherein means are provided for producing firing pulses for the rectifier in the form of trains of pulses having a repetition frequency which is high compared with the alternating current supply frequency, or in the form of extended pulses derived from such trains, by means of oscillator means arranged to be switched on at one or more controllable instant during the supply voltage cycle by means of a voltage or current having a repetition frequency equal to, or harmonically related to, the frequency of the alternating current supply.

The invention also comprehends an alternating current regulator having a control circuit as set forth in the preceding paragraph.

In the accompanying drawings:

FIGURE 1a shows diagrammatically an alternating current regulator with its associated control circuit and load, and FIGURE 1b shows the flow of alternating current through the load under two conditions;

FIGURES 2a and b show two forms of firing pulses generated by conventional control circuits;

FIGURES 4, 5, 6 and 7 show waveforms associated with the control circuit of FIGURE 3;

FIGURE 8 shows diagrammatically an alternative form of control circuit according to the present invention;

FIGURES 9a to 9e show various waveforms associated with the control circuit of FIGURE 8; and FIGURES 10 and 11 show a further alternative form of control circuit according to the present invention.

The regulator 1 is fed from an alternating current supply and supplies power to a load 3. A control circuit 4 is arranged to provide, on leads a, b, c and d, firing pulses to the firing electrodes of the rectifiers 2.

Figure 1:
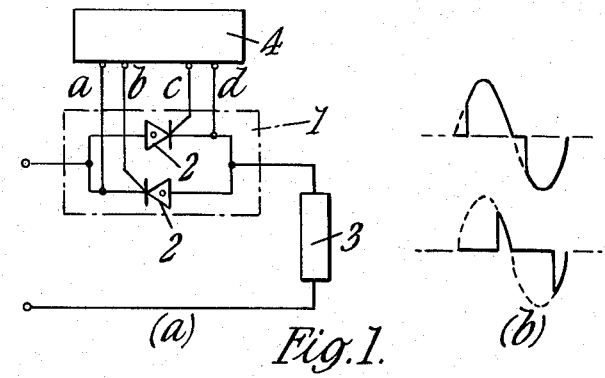
FIGURE 1 shows diagrammatically an elementary form of alternating current regulator 1 consisting of two controllable semi-conductor rectifiers 2, such as Trinistor, arranged in inverse parallel connection.

Control of the alternating current flowing through the load 3 is achieved by varying the phase of the leading edge of the firing pulses with respect to the alternating current supply. The upper waveform of FIGURE 1b shows the situation when the firing pulses are supplied early in each half-cycle, resulting in a relatively high proportion of the available output power being supplied to the load 3, and the lower waveform shows the firing pulse being supplied late in each half-cycle to result in a relatively low proportion of output power being delivered to the load 3.

Figure 2:
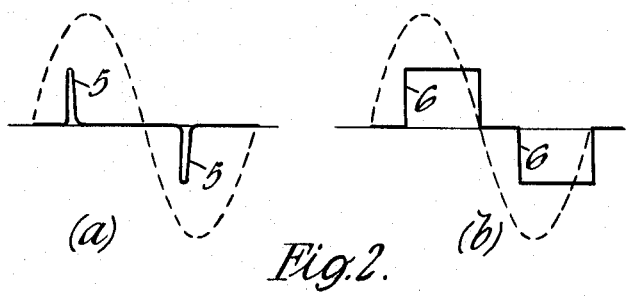

FIGURE 2a shows single short pulses 5 conventionally generated by the control circuit 4, and FIGURE 2b shows pulses 6 extended until the end of the half-cycle, which may be of advantage under certain conditions, for example when the load 3 is inductive.

Figure 3:
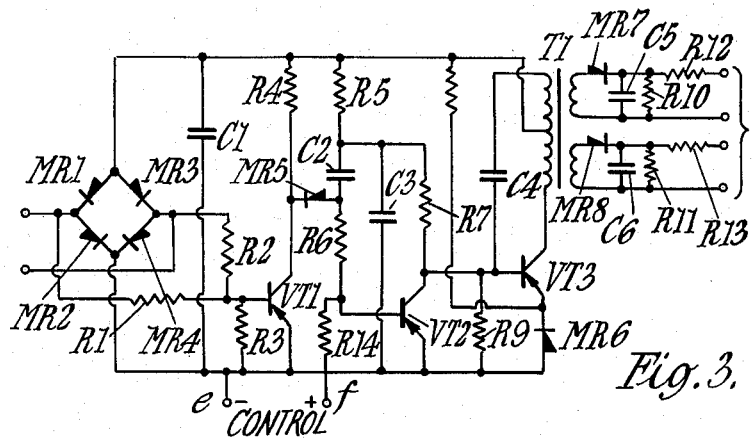
FIGURE 3 show diagrammatically a control circuit according to the present invention.

In carrying the invention into effect according to one convenient mode by way of example, a control circuit for an alternating current regulator is shown in FIGURE 3.

The control circuit is supplied from an alternating current supply in synchronism with the alternating current supply to the regulator 1. The bridge rectifier consisting of four rectifiers MR1–4 is arranged to provide a direct current supply for the circuit and also to supply control voltages to the transistor VT1.

Transistor VT1 is incorporated in an oscillator circuit generating an output of sawtooth waveform in the following manner.

During most of each half-cycle of the alternating current supply, the anode of either rectifier MR2 or MR4 is at a negative potential with respect to the positive lead of the direct current supply and the transistor VT1 is held "on" by the resulting base current flowing through R1 or R2. The collector of transistor VT1 is at a potential nearly equal to that of the positive lead and rectifier MR5 is on reverse.

Under these conditions, capacitor C2 is charged from the direct current supply through resistor R6, decoupling being provided by resistor R5 and capacitor C3. The potential at the junction of capacitor C2 and resistor R6 starts from a negative value and builds up exponentially in a positive direction with a time constant of R6·C2.

When the supply voltage falls to zero at the end of the half-cycle, transistor VT1 is turned off and capacitor C2 discharges through rectifier MR5 and resistor R4. There is thus produced at the upper end of resistor R6, a voltage of exponential sawtooth form 7 (FIGURE 4) having a repetition frequency in phase with and equal to twice the frequency of the alternating current supply 8.

In the absence of any other input to the base of transistor VT2, the base current of that transistor is always negative, and it is therefore held in a conducting condition. However, if a direct current control voltage is applied to the terminals e and f, with the positive connection to terminal f, then a positive voltage is applied through resistor R14 to the base of the transistor VT2 so that the base current of transistor VT2 is cut off at a point in the half cycle when the current through resistor R14 approximately balances that through resistor R6. The phase of this point can be varied by varying the amplitude of the direct current control, so that by these means transistor VT2 can be turned off at a controllable point in every half-cycle.

The transistor VT3, transformer T1, capacitor C4 and resistor R9 are arranged to form a blocking oscillator which is free-running as long as the base of VT3 is maintained at a sufficiently negative potential with respect to its emitter.

The circuit is arranged such that when transistor VT2 is cut off current is supplied to the base of transistor VT3 through resistor R7 causing the blocking oscillator to operate, and when transistor VT2 is on, the base of transistor VT3 is maintained at the potential of the positive supply line and the blocking oscillator thereby maintained in quiescent condition.

Figures 4, 5:
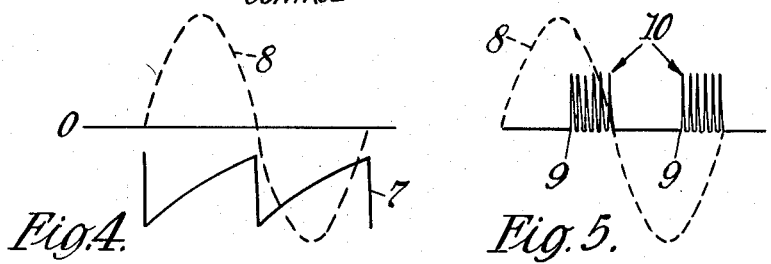

In this way, as shown in FIGURE 5, the blocking oscillator is brought into operation each half-cycle, at a point 9 whose phase can be varied by varying the direct current voltage on terminals $e$ and $f$, to provide a train 10 of pulses continuing until very nearly the end of the half-cycle. It is characteristic of the blocking oscillator that peak amplitude is reached as soon as it is switched on, thereby avoiding an undesirable gradual build-up.

It is preferred, as shown in FIGURE 3, to lengthen the individual pulses in the trains 10 by rectification and smoothing with the aid of rectifiers MR7 and MR8 and capacitors C5 and C6.

In this way the output pulses in each train may be of triangular form as shown in FIGURE 6, or more completely smoothed as shown in FIGURE 7.

If desired, the sawtooth generator may be modified so that the trains of pulses are produced once, twice or more times per cycle of the alternating current supply, and the blocking oscillator may be duplicated or otherwise repeated together with associated gating circuits so that the several blocking oscillators are switched on in rotation during successive cycles of the sawtooth generator, the output pulses thereby appearing in turn at different output terminals.

A circuit in which the trains of output pulses appear at two pairs of terminals in alternate half-cycles of the alternating current supply is shown in FIGURE 8.

This circuit functions in a manner similar to that of FIGURE 3 with the following variations.

A sample of the alternating current supply to the control circuit is fed to the base circuit of transistor VT2 during the half-cycle in which the train or trains of output pulses is not required. This can be taken from either lead of the alternating current supply depending upon the half-cycle upon which it is desired to suppress the train or trains of pulses.

As will be seen from FIGURE 8, a lead is taken from the junction of rectifiers MR3 and MR4 through resistor R15 to the base of transistor VT2.

Th voltage 11 transferred to transistor VR2 is shown in FIGURE 9a, a negative peak being produced during that half-cycle 12 on which rectifier MR4 is on reverse bias.

A voltage similar to voltage 11, but of opposite phase, is taken through resistor R14 to the base of transistor VT4.

The sawtooth voltage 13 generated by transistor VT1 and its associated components is shown in FIGURE 9b. The combination 14 of the voltage 11 and the sawtooth voltage 13, as shown in FIGURE 9c, allows current 15 to flow in the collector circuit of transistor VT2 as shown in FIGURE 9d with the consequent generation of trains of output pulses 10 only in alternate half cycles as shown in FIGURE 9e.

Capacitor C5 is added to prevent a small pulse occurring when the waveform of FIGURE 9a falls to the switching level 16 and the sawtooth voltage of FIGURE 9b has not risen above the switching level.

The output from transistor VT3 is taken from the terminals $g$ and $h$ of transformer T1 and from transistor VT4 from the terminals $j$ and $k$ of transformer T2.

These two outputs may then be fed to trinister gate circuits.

Figure 10:
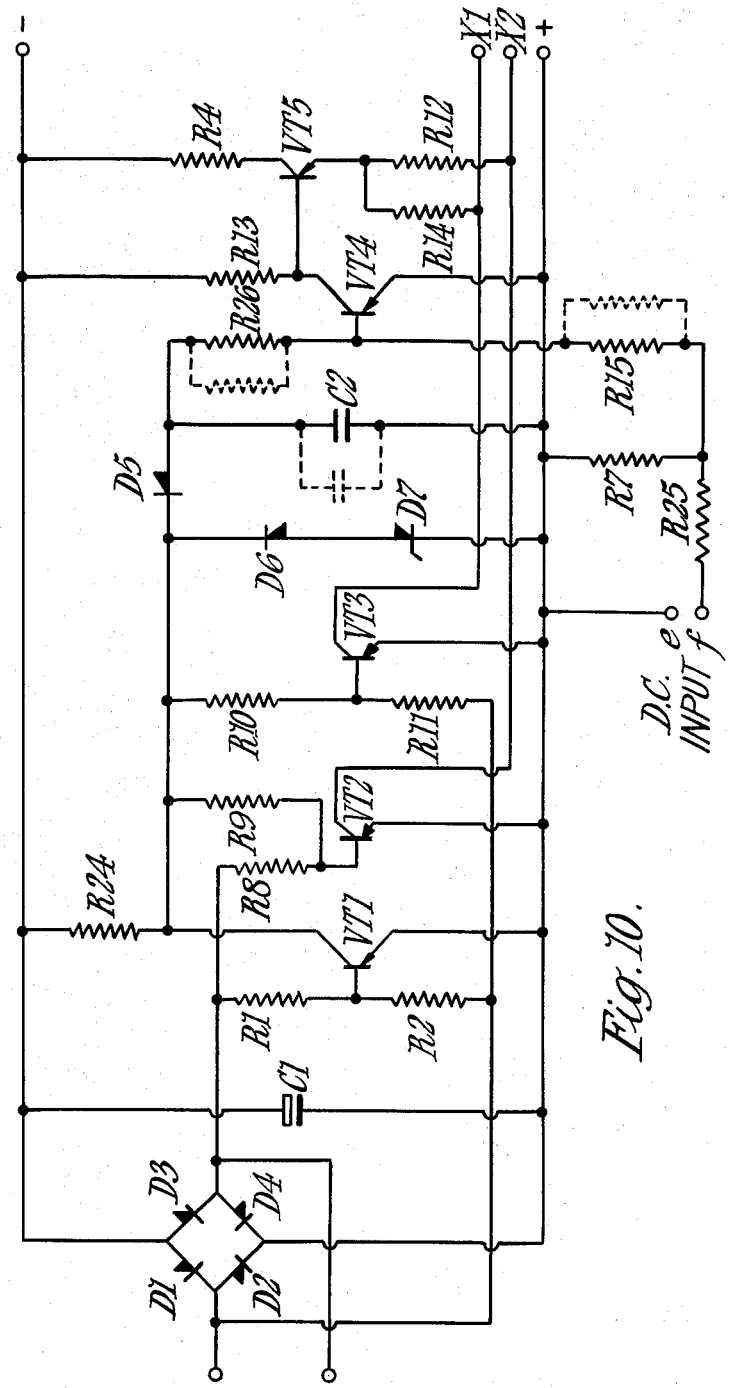

A further alternative form of control circuit is shown in FIGURES 10 and 11 in which the alternating current input is rectified by the diodes D1, D2, D3 and D4 and smoothed by the capacitor C1 to provide a direct current supply for the unit. The transistor VT1 is arranged to be switched on normally by either of the input waves going negative with respect to the positive direct current supply line.

When the alternating current input passes through the zero point, transistor VT1 is switched off and the voltage at its collector rises. The amplitude of this excursion is limited to a zener diode D7 and its series diode D6, the capacitor C2 being charged to this voltage during the period that transistor VT1 is switched off.

A control voltage applied to terminals $e$ and $f$ and the sawtooth waveform generated across capacitor C2 are mixed and compared with the positive direct current supply line via the base-emitter circuit of transistor VT4, the sawtooth waveform thus produced being further amplified, to give a faster rise time, by means of transistor VT5.

The output from the emitter of transistor VT5 is split and coupled by means of the two resistors R12 and R14 to the base circuits of the output transistors VT6 and VT7 which, with their associated components, constitute a free-running blocking oscillator. The base circuits of transistors VT6 and VT7 are held positive with respect to their emitters on alternate half cycles by means of transistors VT2 and VT3 which are held on from the alternating current incoming supply wave through resistors R8 and R11. Resistors R9 and R10 hold transistors VT2 and VT3 on during the transition period at the start and finish of each half cycle (say for 5°).

Various modifications may be made within the scope of the present invention.

What we claim is:

1. A control circuit for an alternating current regulator which incorporates semiconductor recitifiers and which is fed with an alternating current supply, comprising means for deriving a signal having a repetition frequency harmonically related to the frequency of said alternating current supply, a free-running blocking oscillator arranged to be switched on by said signal at at least one controllable instant during the cycle of said alternating current supply, means for deriving pulses for firing the semiconductor rectifiers from the output of said oscillator in the form of trains of pulses having a repetition frequency which is relatively much higher than the frequency of said alternating current supply and is unrelated in phase to said supply, and means for deriving extended pulses for firing said semiconductor rectifiers from said trains of pulses, said signal deriving means consisting of means for deriving from the alternating current supply a signal of sawtooth waveform arranged to switch on the blocking oscillator at a controllable instant during each cycle of said alternating current supply.

2. A control circuit as claimed in claim 1, wherein said sawtooth waveform has a repetition frequency equal to twice the frequency of said alternating current supply.

References Cited by the Examiner

UNITED STATES PATENTS

| | | | |
|---|---|---|---|
| 2,774,919 | 12/1956 | Coles | 331—71 |
| 2,974,269 | 3/1961 | Cooper | 323—24 X |
| 2,976,431 | 3/1961 | Richards | 307—88.5 |
| 2,987,666 | 6/1961 | Manteuffel | 323—22 |
| 3,010,076 | 11/1961 | Szerlip | 331—173 |
| 3,047,792 | 7/1962 | Robinson | 323—24 X |
| 3,109,941 | 11/1963 | Winchel | 323—18 |
| 3,115,610 | 12/1963 | Beguin | 331—71 |
| 3,174,107 | 3/1965 | Quackenbush | 331—71 |

MILTON O. HIRSHFIELD, *Primary Examiner.*

LLOYD McCOLLUM, *Examiner.*

H. B. KATZ, D. L. RAE, G. P. HAAS,
*Assistant Examiners.*